United States Patent [19]
Thrasher, Jr. et al.

[11] 3,731,763
[45] May 8, 1973

[54] LUBRICATING APPARATUS
[75] Inventors: George E. Thrasher, Jr., Pontiac; John T. Bertva, Utica, both of Mich.
[73] Assignee: Master Pneumatic-Detroit, Inc., Sterling Heights, Mich.
[22] Filed: Mar. 25, 1970
[21] Appl. No.: 22,502

[52] U.S. Cl. ...................... 184/7 D, 184/55 A
[51] Int. Cl. ........................................ F16n 7/34
[58] Field of Search ............... 184/29, 2, 3, 55 A, 184/56 A, 7 D, 27 R, 37, 39; 261/78.1

[56] References Cited
UNITED STATES PATENTS

| | | | |
|---|---|---|---|
| 3,297,106 | 1/1967 | Hanson et al. | 184/55 A |
| 3,115,949 | 12/1963 | Malec | 184/55 A |
| 3,581,845 | 6/1971 | Van Nederynen | 184/7 D |
| 3,129,788 | 4/1964 | Heckt | 184/55 |
| 3,112,013 | 11/1963 | Tine | 184/55 X |
| 1,721,231 | 7/1929 | Osborne | 184/55 A X |
| 1,947,430 | 2/1934 | DeMooy | 184/55 A |
| 1,961,477 | 6/1934 | Davis | 184/55 A |
| 2,105,492 | 1/1938 | Gartin | 184/55 A |
| 2,835,267 | 5/1958 | Andresen | 184/55 A X |
| 2,897,919 | 8/1959 | Dellner | 184/55 A |

Primary Examiner—Manuel A. Antonakas
Attorney—Barnes, Kisselle, Raisch & Choate

[57] ABSTRACT

A sensing disc is mounted for movement responsive to starting of a flow of air in a passageway through which air is furnished to a pneumatic tool. Such movement operates valving to admit air under pressure through a branch passageway for actuating a lubricant pump. The sensing disc is spring returned upon discontinuation of the air flow, and return movement thereof closes the valving. The pump delivers a predetermined quantity of lubricant to the tool upon each starting of air flow in the passageway.

20 Claims, 7 Drawing Figures

Patented May 8, 1973
3,731,763
4 Sheets-Sheet 1
FIG. 1
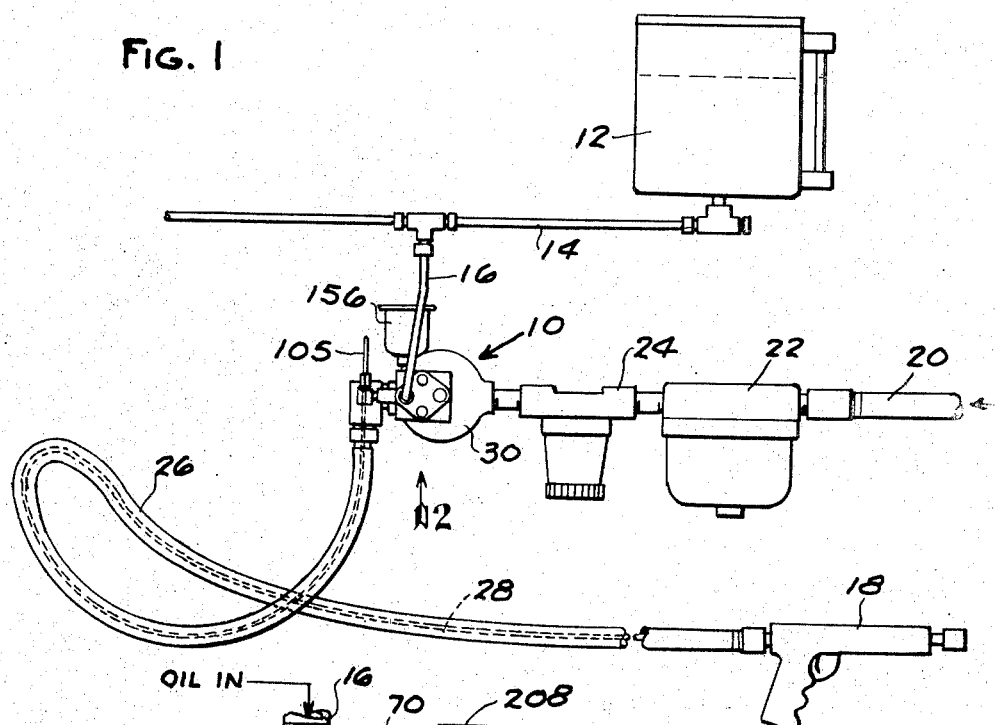
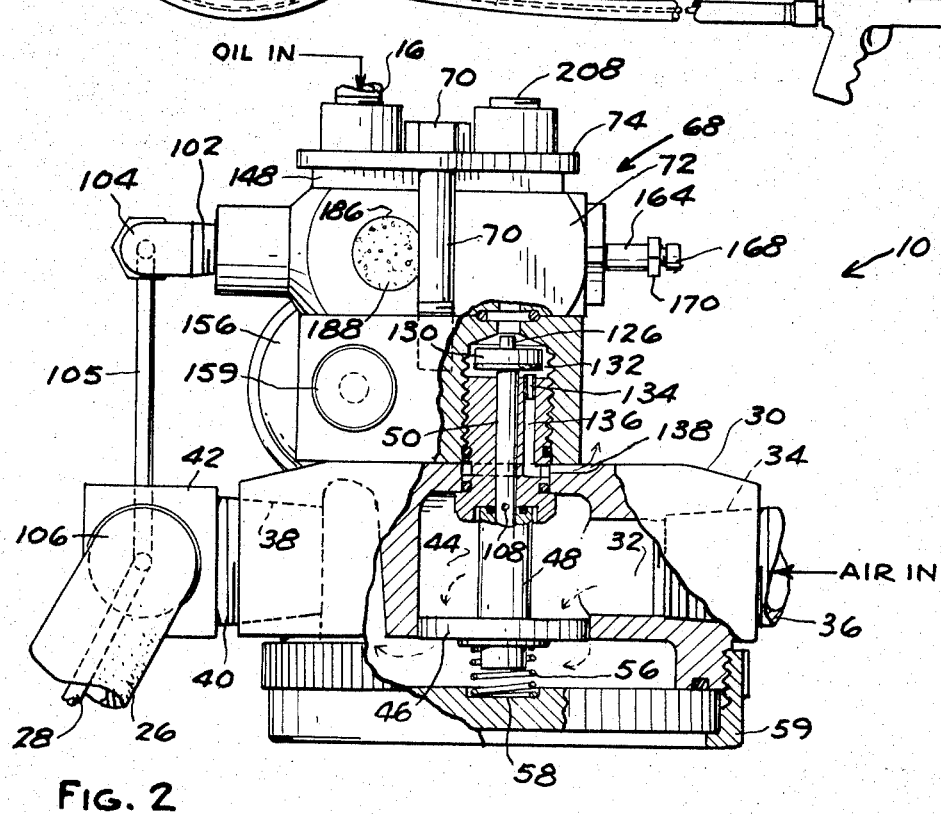
FIG. 2
INVENTORS
GEORGE E. THRASHER, JR
JOHN T. BERTVA
BY
Barnes, Kisselle, Raisch & Choate
ATTORNEYS Patented May 8, 1973

INVENTORS
GEORGE E. THRASHER, JR.
JOHN T. BERTVA
BY
Barnes, Kisselle, Raisch & Choate
ATTORNEYS INVENTORS
GEORGE E. THRASHER, JR
JOHN T. BERTVA
BY
Barnes, Kisselle, Raisch & Choate
ATTORNEYS Patented May 8, 1973

INVENTOR.
GEORGE E. THRASHER, JR.
JOHN T. BERTVA
BY
Barnes, Kisselle, Raisch & Choate
ATTORNEYS

LUBRICATING APPARATUS

This invention relates to a lubricator of the type which furnishes lubricant to a tool or other device which is driven by compressed air.

One type of lubricator in general use for this purpose utilizes a flow of air in a pneumatic system to cause lubricant to be transferred in the form of a fog or mist from a reservoir into a conduit. The flow of air in the conduit propels the lubricant to the equipment to be lubricated. This type of lubricator is known in the art as an air line lubricator, an example of which is disclosed in Gleason et al. U.S. Pat. No. 3,131,786. While this type of lubricator has the advantage of relative simplicity and low cost, it has limitations, one of which is that it will not function satisfactorily under very low rates of flow of air in a conduit.

Moreover, in industrial plants, it is customary to operate many pieces of pneumatic equipment of varying types from a common source of air under pressure, and these pieces of equipment may vary in rate of operation from hundreds of cycles per minute to just a few cycles per day. With conventional air line lubricators, it has not been possible to furnish such widely varying types of equipment each with proper quantities of lubricant.

Another complicating factor is that the conventional air line lubricator does not satisfactorily deliver lubricant through long tortuous air lines. For numerous reasons, it is frequently impossible to mount a lubricator close to the equipment to be lubricated. A further factor is that an operator usually cannot actually see the condition of the lubricated parts and the human tendency is to utilize a lubricator of too great a capacity to guard against a feared inadequacy of lubrication. The result is an unnecessary flooding of the lubricated equipment.

Gleason et al. U.S. Pat. No. 3,421,600 discloses an industrial lubricating system which overcomes these difficulties. However, the system therein disclosed utilizes a counting device which causes lubricant to be delivered after a predetermined number of cycles of operation of the equipment. This counting device is frequently considered too costly where only one or a very few pieces of equipment are to be lubricated.

The object of this invention is to provide a very simple, low cost lubricator structure improved so that it delivers the correct amount of lubricant to the equipment regardless of the distance between the lubricator and equipment, the cyclic rate of operation of the equipment, or the rate of air flow in the air line.

In general, the invention contemplates the use of an air flow sensing disc mounted in a passageway connectible into an air line. The disc moves in one direction when air flow starts in the air line and is spring returned when the air flow ceases. A branch passageway extends from the main passageway to a pneumatically actuated lubricant pump. Valving is provided which opens this branch passageway responsive to air flow induced movement of the sensing disc, and the valving closes responsive to spring-returned movement of the disc. Thus, the pump delivers a predetermined quantity of lubricant upon each starting of air flow in the air line. A lubricant delivery tube extends from the pump to a location adjacent the equipment to be lubricated.

In the drawings:

FIG. 1 is a partly diagrammatic view of a pneumatic system which incorporates the present invention.

FIG. 2 is a plan view in the direction of arrow 2 of FIG. 1 showing a lubricator according to the present invention, parts being broken away and shown in section to illustrate internal structural details.

Figure 3:
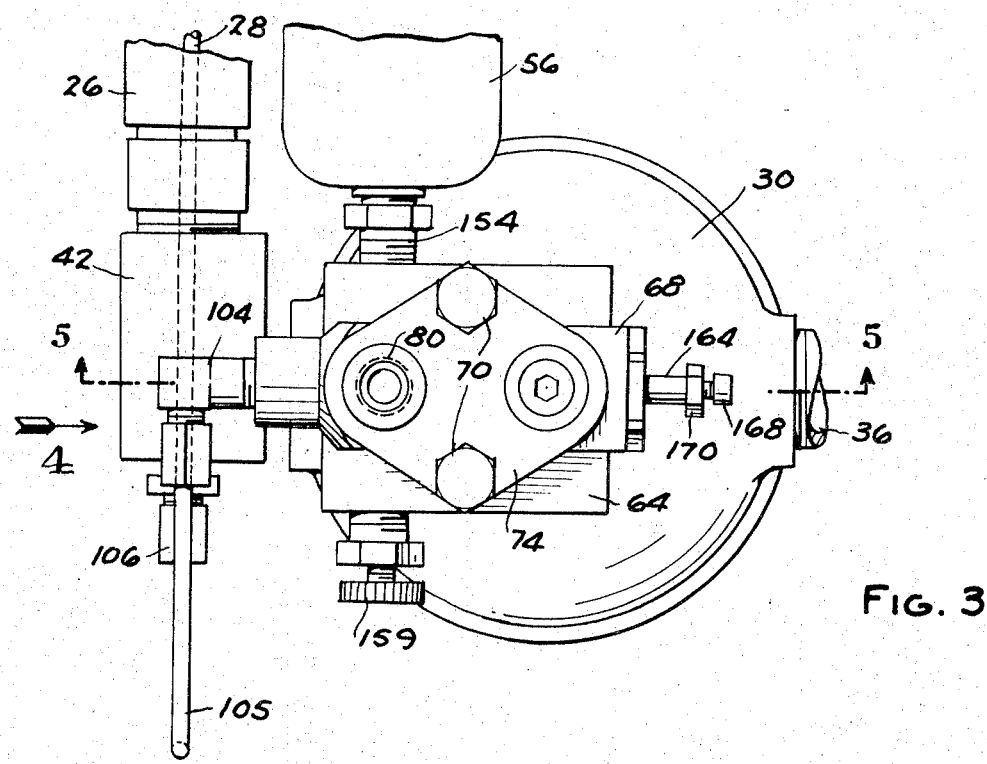
FIG. 3 is an enlarged scale side elevational view of the lubricator.

Shown in FIG. 1 is a pneumatic system which incorporates a lubricator 10 according to the present invention. The lubricator receives lubricant from a remote mounted reservoir 12 through supply lines 14, 16. The lubricator is connected into an air line by which compressed air is furnished to a pneumatically driven tool 18 illustrated as being of the manually operated type.

The portion 20 of the air line upstream of the lubricator contains a conventional filter 22 and pressure regulator 24. The portion 26 of the air line downstream of the lubricator is illustrated as a flexible hose or tube. In the illustrated system, the lubricator delivers lubricant to equipment 18 by a small diameter tube 28 which extends from the lubricator through the interior of hose 26 to a discharge end located at or adjacent equipment 18.

Lubricator 10 has a body 30 which defines an internal passageway 32 having an inlet 34 threaded for reception of a nipple 36 on upstream air line 20. Passageway 32 has an outlet 38 threaded for connection with a nipple 40 on a fitting 42 connected with hose 26.

Figures 5, 6:
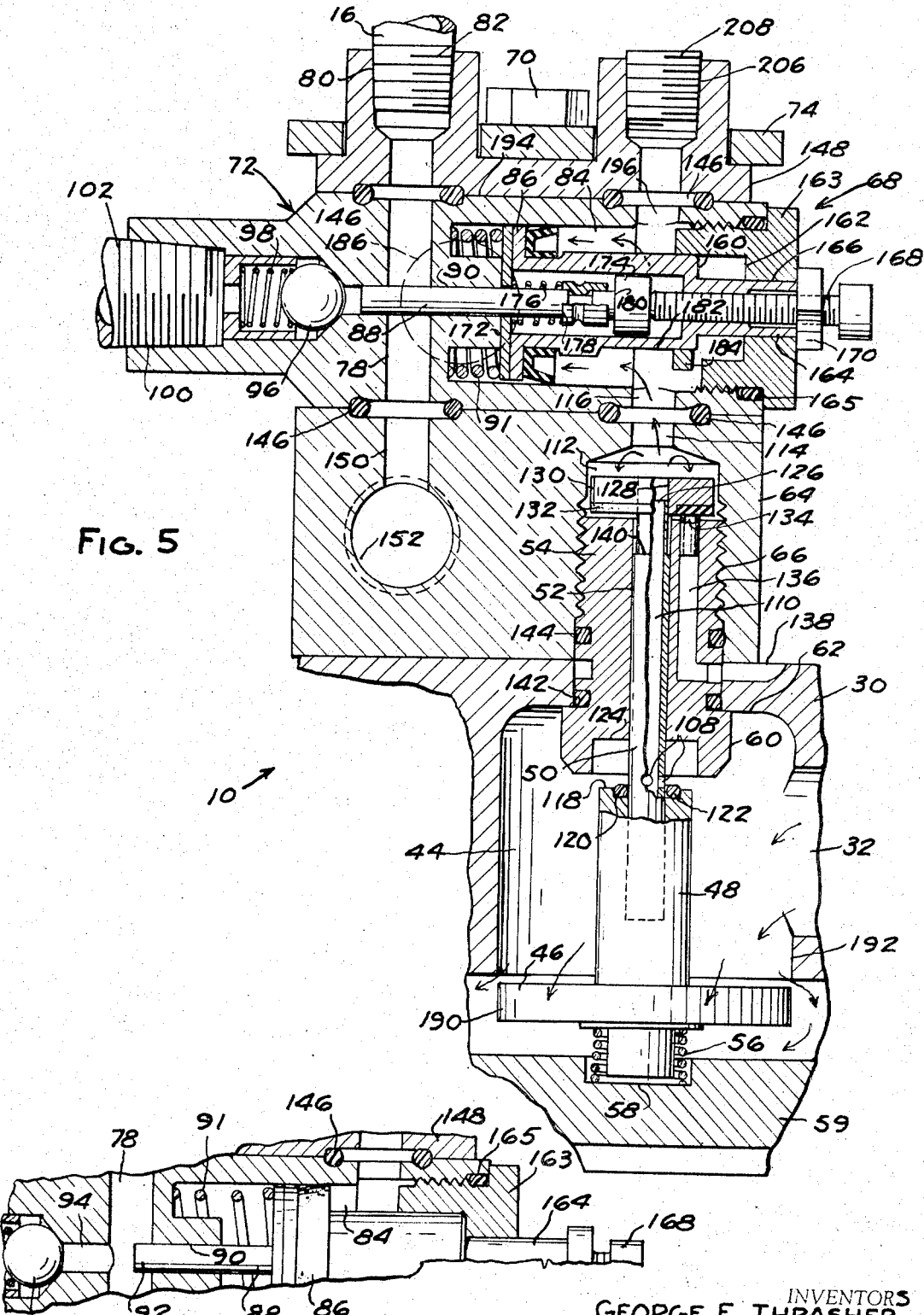
FIG. 5 is an enlarged scale sectional view on line 5—5 of FIG. 3.
FIG. 6 is a fragmentary view of parts of FIG. 5 illustrating the pump components in a different position.

Passageway 32 has an intermediate portion defining a chamber 44. A disc 46 is mounted in chamber 44 so that it extends across the direction of air flow in the chamber. The disc has a stem 48 provided with a smaller diameter tubular extension 50 which extends slidably through a guideway 52 in a fitting 54. Disc 46 is urged in an upward direction as FIGS. 2 and 5 are viewed by means of a coil spring 56 compressed between the disc and a portion 58 of a threaded cap 59 on body 30. When a flow of air starts in passageway 32, disc 46 and stem 48, 50 are pushed downwardly to the FIG. 5 position and when the flow of air discontinues, spring 56 returns the disc and stem upwardly to the FIG. 2 position.

Fitting 54 has a head 60 engaged against the top 62 of chamber 44 and is threaded into a manifold block 64 as at 66. Fitting 54 serves as a bolt which secures body 30 and block 64 together. An injection type lubricant pump 68 is anchored on block 64 as by bolts 70 which extend through block 64, straddle pump body 72, and pass through an anchor plate 74. Pump body 72 has an internal passageway 78 having an inlet 80 threaded for connection with a nipple 82 on lubricant supply line 16.

The pump body defines a pneumatic cylinder 84 having a piston 86 therein connected to a pump plunger 88 which passes slidably through a guideway 90 in the pump body. A return spring 91 is provided for the piston. The forward end portion 92 of the plunger projects into lubricant passageway 78 in alignment with a passageway 94 closed by a ball type check valve member 96 and compressed spring 98 when the pump is not actuated. Downstream of the check valve, the pump body has an outlet 100 threaded for reception of a nipple 102 on a fitting 104, and a lubricant delivery tube 105 extends from this fitting through a nipple 106 and into the interior of pneumatic outlet fitting 42 for a purpose to be described.

Compressed air is introduced into cylinder 84 for actuating pump 68 by means of a branch passageway from passageway 32. The branch passageway includes ports 108 in the wall of tubular stem 50, the interior 110 of the tubular stem, a chamber 112 in block 60 above fitting 54, an opening 114 in the block above chamber 112, and an opening 116 in pump body 72 which registers with opening 114.

At the juncture of stem portions 48 and 50 is a shoulder 118 having a groove 120 which contains an O-ring type seal 122. In the downward position of disc 46 (FIG. 5), ports 108 are open to chamber 32 so that compressed air can flow through the branch passageway 108–116 into cylinder 84. When disc 46 is in its upward position (FIG. 2), seal 122 engages a downwardly disposed shoulder 124 in fitting 54 and seals ports 108 from passageway 32.

The upper end portion 126 of tube 50 passes slidably through an opening 128 in a disc shaped valve element 130 contained in chamber 112. This valve element carries a seal 132 which, in the downward position of disc 46 (FIG. 5), engages against and closes the port 134 of a vent passageway 136 which opens to the atmosphere at 138. In the upward position of disc 46 (FIG. 2), valve 130 is supported above fitting 54 by a shoulder 140 on tube 50 so that seal 132 is disengaged from outlet port 134 and branch passageway 108–116 is vented to the atmosphere.

O-ring seals 142, 144 are provided between fitting 54 and body 30 and block 64 respectively. O-ring seals 146 are also provided between block 64 and pump body 72 and between body 72 and an adaptor 148 forming a part thereof in the illustrated apparatus.

Figure 4:
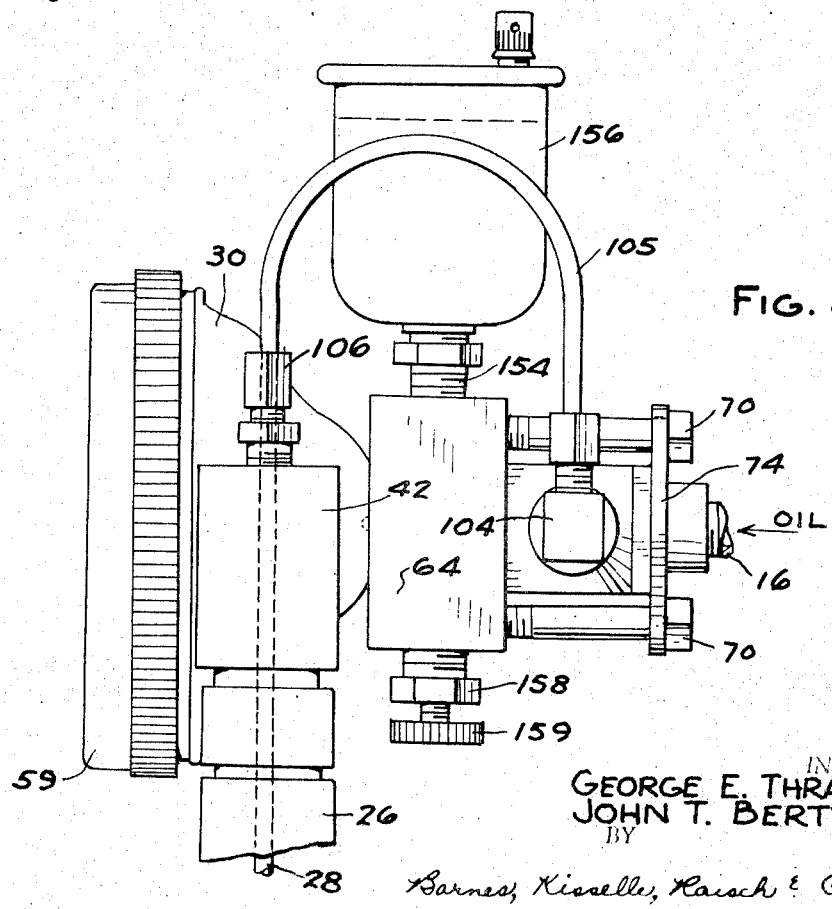
FIG. 4 is an elevational view of the lubricator in the direction of arrow 4 of FIG. 3.
Figure 7:
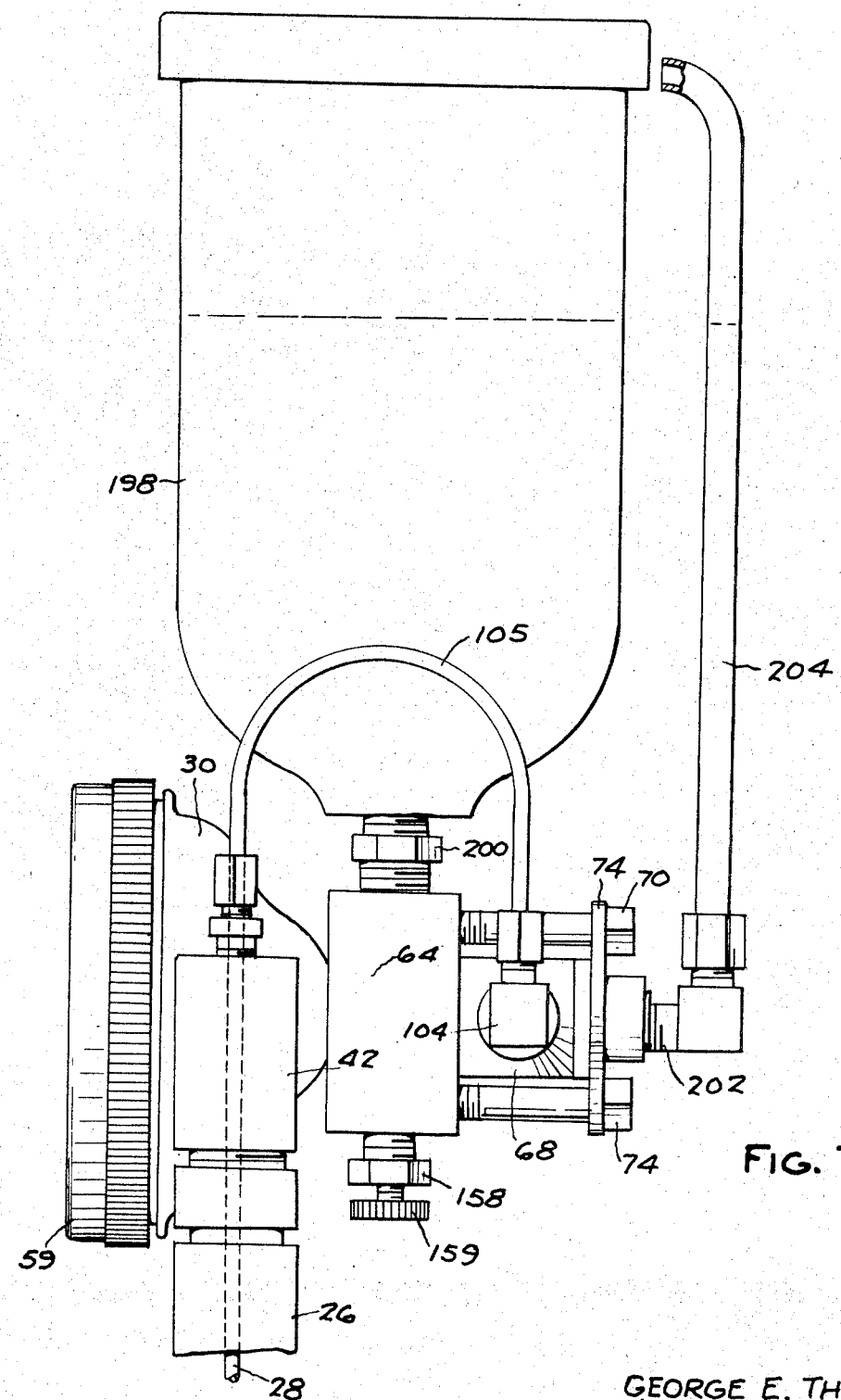
FIG. 7 is a view similar to FIG. 4 but showing the lubricator as used with a lubricant reservoir mounted thereon.

Block 64 has a bore 150 forming a continuation of lubricant passageway 78 in the pump body and bore 150 opens into a transverse bore 152 in the block. Bore 152 extends in a generally vertical direction in use. Threaded into the upper end of this bore is a nipple 154 on a conventional combined vent and float valve 156. The bottom end of bore 152 is closed as by a threaded plug 158 (FIG. 2) which may be provided with a drain cock 159 (FIGS. 4 and 7).

Pump piston 86 has a radial shoulder 160 which in fully retracted position of the piston engages an internal face 162 of a threaded plug 163 forming an end wall of cylinder 84. An O-ring seal 165 is provided between the plug and cylinder wall. An extension 164 from shoulder 160 passes slidably through an end opening 166 in the cylinder, and an adjusting screw 168 is threaded into this extension. The adjusting screw is provided with a lock nut 170.

Pump plunger 88 passes slidably through a wall 172 of piston 86 and the axial position of the plunger relative to the piston is determined by the axial adjustment of screw 168 and the thickness of a spacer 174 disposed between screw 168 and plunger 88. A spring 176 compressed between wall 172 and a shoulder 178 on the plunger maintains the inner end 180 of plunger 88 against spacer 174. Piston 86 has a flat 182 engaged by the flat portion of a D-ring 184 carried by pump body 72 to prevent piston 86 from turning with screw 168 during adjustment thereof.

The non-pressurized end of cylinder 84 is vented by an opening 186 containing a filter 188 of sintered metal or the like.

For a purpose to be described, a bypass is provided which permits a flow of air at a low rate through passageway 32 without depressing disc 46. Advantageously, this is done simply by providing a radial clearance (not illustrated) between the outer periphery 190 of the disc and the portions 192 of the wall of chamber 44 which are adjacent the disc in the upward position of FIG. 2. Typically, the magnitude of this clearance and the strength of spring 56 are coordinated to permit a flow of air of from about 4 c.f.m. to about 5 c.f.m. without moving disc 46.

As a typical example, sensing disc 46 has a diameter of about 1-⅝ inch and an area of about 2 sq. in. The clearance between disc periphery 90 and chamber wall 92 is about 0.010 ± 0.005 inch. Spring 56 exerts a force of about 1-½ lbs. on disc 46 when the disc is in its upward position.

In use, when reservoir 12 is filled, lubricant feeds gravitationally therefrom through supply lines 14, 16, pump passageway 78, bores 150, 152, and upwardly into vent 156 until the level of lubricant is above pump 68 whereupon the float valve therein closes. The lubricant supply system is thereby primed and sealed. Compressed air is introduced into air line 20 which pressurizes the pneumatic system down to tool 18 including passageway 32 and hose 26. The lubricant supply system from pump 68 through tubes 105 and 28 can be primed either by actuating the lubricator numerous times in the manner to be described or by manually operating pump piston 86 numerous times by pushing upon and releasing the end of adjusting screw 168.

When tool 18 is actuated, air begins to flow through air line 20, passageway 32, and hose 26. This air flow depresses disc 46 from the position of FIG. 2 to the position of FIG. 5. Stem 48, 50 are carried downwardly, disengaging seal 122 from shoulder 124. This opens ports 108 so that air under pressure flows from passageway 32 through branch passageway 108–116. Compressed air in chamber 112 forces poppet valve 130 downwardly so that seal 132 thereon closes port 134 to contain the compressed air in the branch passageway.

The compressed air forces piston 86 leftward from the position of FIG. 6 to the position of FIG. 5 causing the forward end 92 of pump plunger 88 to enter passageway 94. A quantity of lubricant predetermined by the diameter of the plunger and its extent of penetration into passageway 94 is forced past check valve 96 and through outlet 100 and tubing 105, 28 to a location adjacent tool 18. The delivery end of tube 28 could extend directly into tool 18 or could terminate just short of the tool, in which case the flow of air through hose 26 would immediately blow the lubricant into the tool. Disc 46 remains depressed for so long as tool 18 is being operated.

When the tool is deactuated, the flow of air in passageway 32 ceases and spring 56 forces disc 46 and its stem 48, 50 upwardly from the FIG. 5 position to the FIG. 2 position. Seal 122 engages shoulder 124 and closes ports 108. Shoulder 140 on stem portion 50 engages the bottom of poppet valve 130 and raises it off of vent port 134. The compressed air in branch passageway 108–116 and cylinder 84 is thereby vented to the atmosphere and pump spring 91 returns piston 86 from the position of FIG. 5 to the position of FIG. 6. Upon each subsequent starting of tool 18, pump 68 is again actuated to deliver an accurately measured quantity of lubricant to the tool in the manner described.

In a typical lubricator 10, disc 46 moves through a range of about 0.040 to about 0.090 or 0.100 inch, depending on the rate of air flow required to operate tool 18. The sliding connection between tube end 126 and poppet valve 130 enables disc 46 to continue downward movement independently of the poppet valve after this valve has seated on port 134. This facilitates different ranges of movement of the disc responsive to different rates of air flow through passageway 32.

It frequently happens that leakages occur in the pneumatic circuitry or tool 18 downstream of lubricator 10. This results in a low rate of air flow through passageway 32 even though tool 18 is not being operated. It is undesirable to have the lubricator operate under these conditions. Therefore, the bypass described above is provided to facilitate air flow past disc 46 at low rates without depressing the disc and operating pump 68.

Adjusting screw 168 and proper selection of spacer 174 makes it possible for a typical lubricator 10 to deliver lubricant to tool 18 at a rate of about 1/20 of a drop to about 1 drop for each cycle of operation. For present purposes, a drop is defined as 1/30 of a cc. By way of example, assuming that plunger 88 has a diameter of ⅛ inch, theoretically it would deliver 1 drop of lubricant when adjusted to penetrate passageway 94 0.160 inch. However, there is a certain amount of leakage past the plunger in passageway 94; and in practice, plunger 88 is adjusted to penetrate 0.190 inch. As further examples, the plunger is adjusted to penetrate about 0.040 inch to deliver 1/10 of a drop and to penetrate about 0.030 inch to deliver about 1/20 of a drop. Typical air-operated equipment 18 requires lubrication in the range of from about ⅛ to about 1/6 of a drop per cycle of operation.

Lubricator 10 is relatively simple and inexpensive and it delivers a precisely measured quantity of lubricant directly to or closely adjacent tool 18 under varying rates of air flow and over widely varying distances and flow paths between the lubricator and tool.

While it is advantageous to thread lubricant delivery tube 28 through the interior of the downstream hose or other air line to the tool, it is not necessary to do so. Tube 28 could extend exteriorly of hose 26 directly to tool 18 or to a fitting in the hose adjacent the tool. In the apparatus illustrated, tube 105 and tube 28 comprise different portions of one continuous length of tubing.

It is possible to utilize disc 46 and its associated components to actuate more than one pump 68 simultaneously. To accomplish this, bolts 70 would be loosened, adaptor 148 removed, and a second pump body 72 mounted directly on the top surface 194 of the pump body proper so that the lubricant passageways 78 are in extension of one another and the compressed air openings 116 of the upper pump body is in registry with an upper similar opening 196 in the lower pump body.

Additional O-rings 146 would be installed on the upper pump body and adaptor 148 clamped to the top of the upper pump body in the manner illustrated with respect to the single pump body in FIG. 5 but utilizing longer bolts 70. This stacking of the pumps is illustrated in Gleason et al. U.S. Pat. No. 3,421,600 (referred to above). Upon depressing of disc 46, compressed air would actuate the pistons 86 of both pumps and cause their respective plungers 88 to eject lubricant through their respective outlets 100 for delivery through suitable tubes to the pieces of equipment to be lubricated.

FIG. 7 shows a lubricator similar to that described but in a modified assembly wherein a lubricant reservoir 198 is mounted directly on block 64. The outlet fitting 200 in the bottom of the reservoir is threaded into the top of bore 152 instead of nipple 154 of float valve 156. In this assembly a fitting 202 is threaded into portion 80 of lubricant passageway 78 and a riser tube 204 is provided on this fitting. Lubricant from reservoir 198 feeds gravitationally through bores 152, 150, passageway 78, and upwardly in riser tube 204 to the level of lubricant in the reservoir. This primes the lubricant supply system for pump 68. The assembly illustrated in FIG. 7 operates in a manner similar to that described above.

By using adaptor 148, it is not necessary to tap into the main body portion of pump body 72 for connection to lubricant supply line 16. Thus, the bodies of the stackable pumps can be kept relatively small.

Adaptor 148 is provided with a second passageway 206 aligned with top opening 196 and closed by a threaded plug 208. Should it be desired to actuate a remotely mounted pump 68 for any purpose, plug 208 is removed and a nipple on one end of an air line is threaded thereinto, the other end of the air line being connected into the passageway 206 of the remote pump.

We claim:

1. A lubricator comprising pump means having an inlet adapted for connection with a source of lubricant and an outlet, said pump means being operable upon actuation to deliver a substantially predetermined quantity of lubricant through said outlet, means providing a body which defines a passageway having an inlet and outlet adapted for connection respectively with upstream and downstream portions of an air line, sensing means effective to respond to each starting and stopping of a flow of air through said passageway, actuating means operable to exert and relieve actuating force on said pump means in reaction respectively to each of the air flow starting and stopping responses of said sending means, so that said predetermined quantity of lubricant is delivered through said outlet upon each starting of air flow in said passageway, said sensing means comprising a member extended across the path of air flow in said passageway, said member being movable in one direction in response to each starting of said air flow and being spring returned in the other direction in response to each stopping of said air flow, means defining a bypass for passage of air past said member in spring-returned position thereof, the effective open area of said bypass and the force exerted by said spring being so coordinated that they facilitate a flow of air through said passageway up to a predetermined rate without movement of said member in response thereto, whereby to prevent operation of said lubricator upon small leakages of air from said air line downstream of said lubricator.

2. The lubricator defined in claim 1 wherein said bypass comprises clearance between the outer periphery of said member and adjacent portions of said body defining said passageway.

3. The lubricator defined in claim 1 wherein said predetermined rate is in the range of from about 4 c.f.m. to about 5 c.f.m.

4. A lubricator comprising pump means having an inlet adapted for connection with a source of lubricant and an outlet, said pump means being operable upon actuation to deliver a substantially predetermined quantity of lubricant through said outlet, means providing a body which defines a passageway having an inlet and outlet adapted for connection respectively with upstream and downstream portions of an air line, sensing means effective to respond to each starting and stopping of a flow of air through said passageway, actuating means operable to exert and relieve actuating force on said pump means in reaction respectively to each of the air flow starting and stopping responses of said sensing means, so that said predetermined quantity of lubricant is delivered through said outlet upon each starting of air flow in said passageway, said actuating means including a pneumatic piston operably connected with said pump means, a branch from said passageway for conducting air under pressure to said piston, and valving which opens and closes said branch in reaction respectively to air flow starting and stopping responses of said sensing means, said valving including a first valve which so opens and closes said branch, said branch having an exhaust port, a second valve operable to close said port responsive to introduction of air under pressure into said branch upon opening of said first valve, said second valve being operable to open said port in reaction to air flow stopping response of said sensing means.

5. The lubricator defined in claim 4 wherein said piston is spring returned upon opening of said port and relief of pressure thereon.

6. A lubricator comprising pump means having an inlet adapted for connection with a source of lubricant and an outlet, said pump means being operable upon actuation to deliver a substantially predetermined quantity of lubricant through said outlet, means providing a body which defines a passageway having an inlet and outlet adapted for connection respectively with upstream and downstream portions of an air line, sensing means effective to respond to each starting and stopping of a flow of air through said passageway, actuating means operable to exert and relieve actuating force on said pump means in reaction respectively to each of the air flow starting and stopping responses of said sensing means, so that said predetermined quantity of lubricant is delivered through said outlet upon each starting of air flow in said passageway, said sensing means comprising a member with a stem movably mounted on said body, said member extending across the path of air flow in said passageway and being urged by a spring in a direction counter to the direction of air flow in said passageway, said member and stem being movable in one direction against the urging of said spring in response to said starting of air flow and being returnable in the other direction by said spring in response to said stopping of air flow, said actuating means including a pneumatic piston operably connected with said pump means, a branch from said passageway for conducting air under pressure to said piston, said branch having an exhaust port to the atmosphere, means providing a first valve element mounted on said stem which opens and closes said branch upon movement of said member respectively in said one direction and said other direction, and means providing a second valve element mounted on said stem which closes and opens said port upon movement of said member respectively in said one direction and said other direction.

7. The lubricator defined in claim 6 wherein said second valve element is movable to close said port responsive to air under pressure in a portion of said branch.

8. The lubricator defined in claim 7 wherein said stem has support means which supports said second valve element in port-open position when said member is in its spring-returned position, said second valve element being movable with said stem in a range of movement in said one direction to close said port and movement thereof being halted upon closing of said port, said stem being movable in said one direction beyond said range independently of said second valve element to facilitate movement of said member through different distances in said one direction in response to different air flow rates in said passageway, said support means being operable upon spring-urged movement of said stem in said other direction to move said second valve element to port-open position.

9. The lubricator defined in claim 8 wherein said support means comprises means forming a shoulder on said stem which engages said second valve element, said stem having a slidable connection with said second valve element to facilitate said independent motion.

10. The lubricator defined in claim 9 wherein said stem projects slidably through an opening in said second element.

11. The lubricator defined in claim 8 wherein said body defines a guideway within which said stem moves, said branch having portions disposed within the confines of said guideway.

12. The lubricator defined in claim 11 wherein said branch portion comprises a hollow portion of said stem.

13. The lubricator defined in claim 12 wherein said hollow portion of said stem has porting which communicates with said passageway, said first valve element comprising a shoulder on said stem which carries a seal surrounding said hollow portion adjacent said porting, said body having a shoulder engaged by said seal in said spring-returned position of said member for closing said porting, said seal disengaging said body shoulder upon movement of said member in said one direction for opening said porting.

14. The lubricator defined in claim 6 wherein said first valve element comprises a shoulder on said stem which moves away from and toward a shoulder on said body for opening and closing said passageway.

15. A lubricator comprising pump means having an inlet adapted for connection with a source of lubricant and an outlet,
said pump means being operable upon actuation to deliver a substantially predetermined quantity of lubricant through said outlet,
means providing a body which defines a passageway having an inlet and outlet adapted for connection respectively with upstream and downstream portions of an air line,
sensing means effective to respond to each starting and stopping of a flow of air through said passageway,
actuating means operable to exert and relieve actuating force on said pump means in reaction respectively to each of the air flow starting and stopping responses of said sensing means, so that said predetermined quantity of lubricant is delivered through said outlet upon each starting of air flow in said passageway,
said pump means having a body with two openings, one of which forms said inlet and the other of which forms a vent, and means providing a riser passageway connected with said vent to facilitate initial filling of said pump means with lubricant.

16. The lubricator defined in claim 15 wherein said pump means body is mounted on the first-mentioned body and a lubricant reservoir is mounted on said pump body, said reservoir having an outlet connected with said pump means inlet, said riser passageway comprising a tube which extends upwardly above the level of lubricant in said reservoir.

17. The lubricator defined in claim 15 wherein said pump means inlet is adapted for connection with a remote lubricant reservoir, said riser passageway having a float valve therein which closes said passageway responsive to rising of the level of lubricant therein above the level of said pump means.

18. A lubricator comprising pump means having an inlet adapted for connection with a source of lubricant and an outlet,
said pump means being operable upon actuation to deliver a substantially predetermined quantity of lubricant through said outlet,
means providing a body which defines a passageway having an inlet and outlet adapted for connection respectively with upstream and downstream portions of an air line,
a sensing member movable toward relative downstream and upstream positions in said passageway and being biased toward said upstream position,
said member being movable against said bias to said downstream position in response to starting of a flow of air through said passageway,
the influence on said member of said air flow being effective to retain said member in said downstream position against said bias for so long as said air flow continues,
said member being returned by said bias to said upstream position in response to stopping of said air flow,
actuating means operable to exert and relieve actuating force on said pump means in reaction respectively to air flow starting and stopping responses of said sensing member so that said predetermined quantity of lubricant is delivered through said outlet upon each starting of air flow in said passageway.

19. The lubricator defined in claim 18 wherein said bias comprises a spring urging said member toward said upstream position.

20. The lubricator defined in claim 18 wherein said actuating means includes a pneumatic piston operably connected with said pump means, a branch from said passageway for conducting air under pressure to said piston, and valving which opens and closes said branch in reaction respectively to air flow starting and stopping responses of said sensing means.

* * * * *